United States Patent [19]

Johannesen

[11] 4,236,614

[45] Dec. 2, 1980

[54] DRUM BRAKE HAVING PARKING MECHAISM

[75] Inventor: Donald D. Johannesen, South Bend, Ind.

[73] Assignee: The Bendix Corporation, Southfield, Mich.

[21] Appl. No.: 95,014

[22] Filed: Nov. 16, 1979

Related U.S. Application Data

[63] Continuation of Ser. No. 890,752, Mar. 27, 1978, abandoned.

[51] Int. Cl.³ .................... F16D 51/22; F16D 51/24
[52] U.S. Cl. .................... 188/326; 188/79.5 P; 188/106 F; 188/106 A; 188/332
[58] Field of Search ............ 188/72.9, 79.5 R, 79.5 P, 188/79.5 GE, 79.5 S, 79.5 SC, 106 A, 106 F, 325, 326, 331, 332, 333, 362, 363

[56] References Cited

U.S. PATENT DOCUMENTS

| | | | |
|---|---|---|---|
| 2,842,229 | 7/1958 | Ross | 188/106 A |
| 3,027,981 | 4/1962 | Erickson | 188/106 A |
| 4,180,149 | 12/1979 | Johannesen et al. | 188/363 |

FOREIGN PATENT DOCUMENTS

| | | | |
|---|---|---|---|
| 692797 | 5/1940 | Fed. Rep. of Germany | 188/331 |
| 1480334 | 7/1969 | Fed. Rep. of Germany | 188/325 |
| 1021973 | 3/1966 | United Kingdom | 188/362 |

*Primary Examiner*—Edward R. Kazenske
*Attorney, Agent, or Firm*—Paul David Schoenle; Ken C. Decker

[57] ABSTRACT

A drum brake assembly includes a pair of brake shoes which are movable to a braking position by a hydraulic actuator. In order to maintain the pair of brake shoes adjacent the drum an adjuster is disposed between the pair of brake shoes opposite the hydraulic actuator. The adjuster carries a parking mechanism to manually move the pair of brake shoes to the braking position independently of the hydraulic actuator. The parking mechanism comprises a pair of levers which are pivotally connected to projections on the adjuster and the levers oppose one of the pair of brake shoes such that pivoting of the pair of levers moves the adjuster and the other brake shoe away from the one brake shoe. A spacer and a washer are disposed between the one brake shoe and abutment surfaces on each pair of levers and the adjuster movably supports the spacer and the washer.

3 Claims, 3 Drawing Figures

DRUM BRAKE HAVING PARKING MECHAISM

This is a continuation of application Ser. No. 890,752, filed Mar. 27, 1978, now abandoned.

BACKGROUND OF THE INVENTION

In a drum brake assembly, such as illustrated in U.S. application Ser. No. 791,667, a parking strut and a lever generally cooperate to manually urge a pair of brake shoes to a braking position. The strut extends between the pair of brake shoes near a hydraulic actuator and the lever is pivotally mounted on one of the brake shoes such that the lever is pivoted to push the strut and other brake shoe away from the one brake shoe which pivotally supports the lever.

When large diameter axle shafts are required, the amount of space available within a drum brake assembly is reduced so that a parking brake strut, which extends between a pair of brake shoes near the hydraulic actuator, interfers with the axle shaft between the pair of brake shoes. Consequently, it is desirable to eliminate the parking brake strut, but retain the parking brake feature.

SUMMARY OF THE PRESENT INVENTION

The present invention relates to a drum brake assembly wherein a pair of brake shoes are movable by a hydraulic actuator from a non-braking position to a braking position. The pair of brake shoes carry an adjustment means opposite the hydraulic actuator in order to maintain the pair of brake shoes adjacent the drum which is to be braked.

In accordance with the invention, the adjustment means carries a parking mechanism which is manually operable to move the pair of brake shoes to the braking position independently of the hydraulic actuator. The parking mechanism comprises a pair of levers which are pivotally mounted on the adjustment means. Abutment surfaces on the pair of levers oppose one of the pair of brake shoes such that pivoting of the pair of levers causes the abutment surfaces to move towards the one brake shoe, thereby moving the other brake shoe and the adjustment means to move away from the one brake shoe.

A preferred embodiment of the present invention provides a pair of projections on the adjustment means for pivotally supporting respective levers and the adjustment means slidably carries a spacer which is engageable with the one brake shoe and the abutment surfaces to convert the rotational movement of the levers to transverse movement and transmit transverse movement to the one brake shoe. The pivotal connection between one lever and the adjustment means is offset relative to the pivotal connection between the other lever and the adjustment means.

It is a primary object of the present invention to incorporate a parking mechanism with an adjustment means for a drum brake assembly so that a conventional parking brake strut extending between a pair of brake shoes can be eliminated.

DETAILED DESCRIPTION

Figure 1:
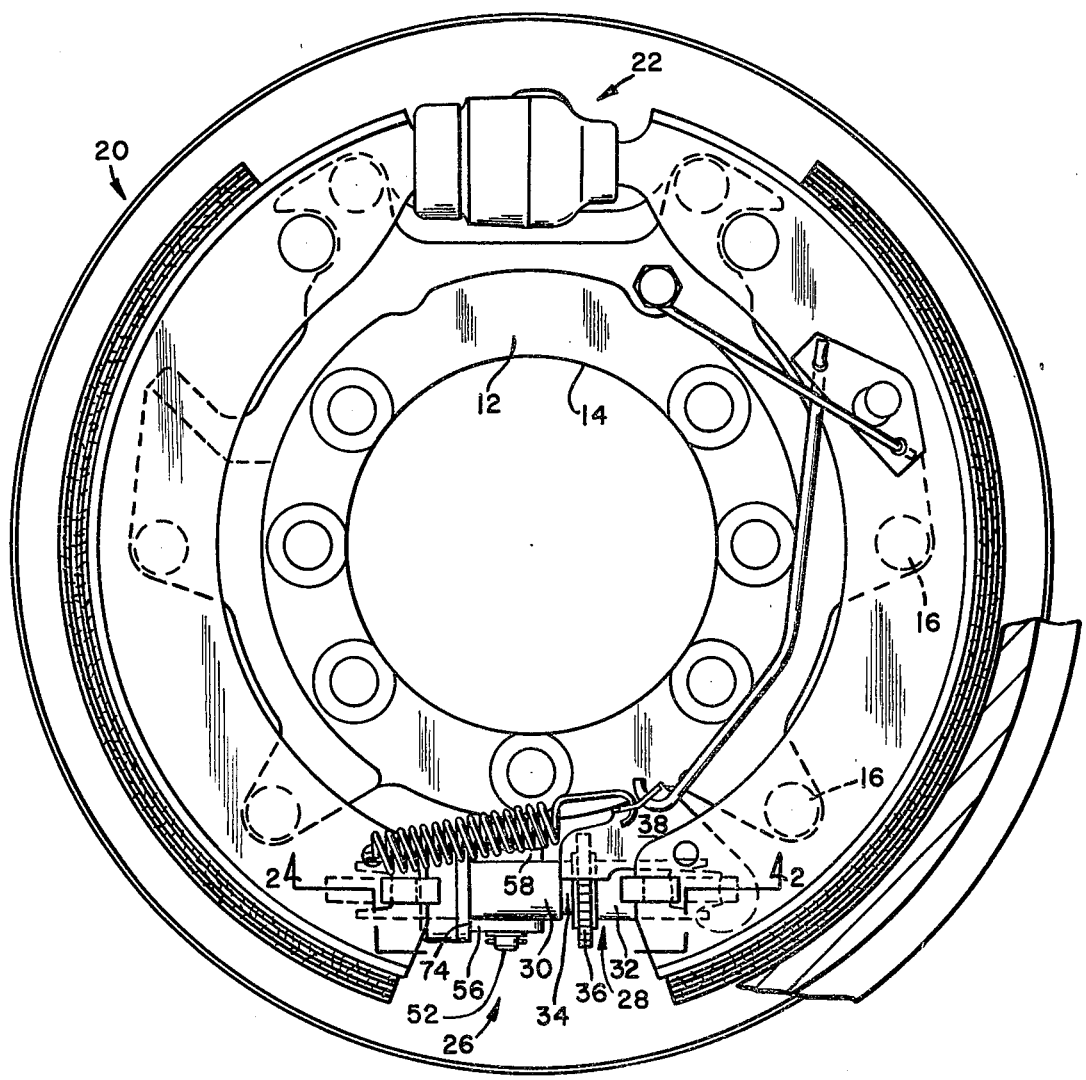
FIG. 1 is a side view of a drum brake assembly constructed in accordance with the present invention.

The drum brake assembly 10 illustrated in FIG. 1 is similar to the drum brake assembly of U.S. application Ser. No. 784,010, of which I am a co-inventor. A backing plate 12 is secured by any suitable means to an axle housing (not shown) and an opening 14 is dimensioned to permit a large diameter axle shaft to extend axially therethrough.

A plurality of lugs at 16 extend radially from the backing plate 12 to slidably support a pair of brake shoes 18 and 20 and a hydraulic actuator 22 is engageable with one end of the brake shoes 18 and 20. The hydraulic actuator 22 operates to move the pair of brake shoes 18 and 20 to a braking position engaging the drum 24. In order to maintain the pair of brake shoes adjacent the drum 24, regardless the friction lining dimension of each brake shoe, an adjustment means 26 is engageable with the other end of each brake shoe to take up the wear of the friction lining of each brake shoe. The adjustment means 26 comprises an extendible member 28 which includes a nut 30, a sleeve 32 and a threaded stem 34. A star wheel 36 is engageable with a pawl 38 so that the pawl imparts rotation to the star wheel and threaded stem when the clearance between the pair of brake shoes and the drum is greater than a predetermined value.

Figure 2:
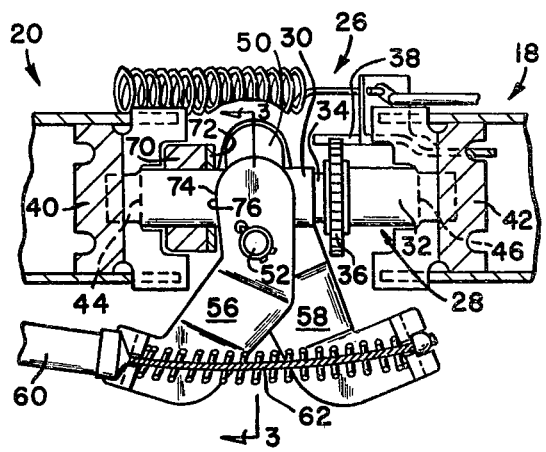
FIG. 2 is a cross-sectional view taken along line 2—2 of FIG. 1.

Turning to FIG. 2, it is seen that the brake shoes 18 and 20 include bifurcated webs for fixedly securing a plate 40 which is attached to the brake shoe 20 and a plate 42 which is attached to the brake shoe 18. The nut 30 and the sleeve 32 include slots 44 and 46 which receive the plate 40 and 42, respectively. Consequently, the extendible member 28 is carried between the pair of brake shoes opposite the hydraulic actuator 22.

Figure 3:
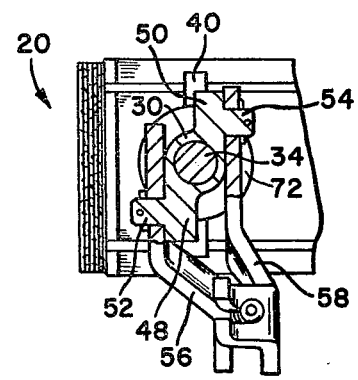
FIG. 3 is a cross-sectional view along line 3—3 of FIG. 2.

In accordance with the invention the nut 30 forms projections 48 and 50, see FIG. 3, which extend radially therefrom to define pins 52 and 54, respectively. The projections and pins extend from opposite sides of the nut and are offset from each other, so that the lever 58 is pivotally mounted on the top side of the extrudible member 28 and the lever 56 is pivotally mounted on the bottom side of the extrudible member 28, as shown in FIG. 1. In FIG. 3 it is seen that the projection 50 extends upward from the nut 30 and the projection 48 extends downward from the nut 30. Moreover, the projection 50 and pin 54 are offset to the right of the center of the nut 30, while the projection 48 and pin 52 are offset to the left of the center of nut 30. The pair of levers 56 and 58 are pivotally anchored on the respective pins 52 and 54 and the pair of levers 56 and 58 extend from their pivotal connection with the nut 30 to engage a conduit 60 and a cable 62 extending from the conduit 60, respectively. Because the cable 62 is substantially concentric with the conduit 60, the lever 56 and the lever 58 are bent to provide for the engagement between the pair of levers and the conduit and cable to coincide with the axis of the conduit. The pair of levers cooperate with the extendible member and the pair of brake shoes to substantially define a parking mechanism.

A spacer 70 is slidably carried by the nut 30 between the projections 48 and 50 and the engagement with the plate 40 of the brake shoe 20. Adjoining the spacer is a washer 72 which is free to slide with the spacer on the nut 30 and rotate relative to the nut 30. The spacer is engageable with the brake shoe plate 40 and the washer 72 is engageable with an abutment surface 74 on the lever 56 and an abutment surface 76 on the lever 58. The abutment surface 74 on lever 56 is disposed above the pivotal connection at pin 52 while the abutment surface 76 on lever 58 is disposed below the pivotal connection at pin 54.

MODE OF OPERATION

When a vehicle operator steps on a brake pedal, presurized fluid is communicated to the hydraulic actuator 22 to radially expand the pair of brake shoes 18 and 20 into engagement with the rotating drum 24, thereby retarding the rotation of the latter. The operation of the drum brake assembly 10 during service braking is the same as the operation of a conventional drum brake.

When the vehicle is parked, the vehicle operator steps on the parking brake pedal (not shown) which retracts the cable 62 within the conduit 60 as the cable 62 is connected by any suitable means to the parking brake pedal. In addition, the conduit 60 moves relative to the cable 62 to telescope the cable into the conduit 60. Therefore, the lever 56 is pivoted counterclockwise, viewing FIG. 2, about pin 52 and the lever 58 is pivoted clockwise about pin 54. The pivoting of the pair of levers causes the abutment surfaces 74 and 76 to rotate relative to the pins, thereby imparting movement to the washer 72 and spacer 70 towards the brake shoe plate 40. With the spacer 70 in engagement with the plate 40, the pivoting of the abutment surfaces toward the washer 72 imparts a force to the nut 30 urging the nut 30 to move away from the plate 40. Consequently, further pivoting of the levers and abutment surfaces causes the nut 30, stem 34 and sleeve 32, to move away from the plate 40, thereby radially expanding the brake shoe 18 into engagement with the drum 24. When the brake shoe 18 is in engagement with the drum 24, the pivoting levers and abutment surfaces continue to slide the spacer and washer on the nut 30 away from the brake shoe 18, thereby urging the brake shoe 20 to radially expand into engagement with the drum 24. When both brake shoes are in engagement with the drum 24 the drum is prevented from rotating so that the vehicle is rendered stationary.

Viewing FIG. 1, it is seen that the pair of levers 56 and 58 extend axially inwardly relative to the backing plate 12 between two consecutive lugs 16 so that the levers take up a small radial width and are spaced from the central space defined by the inner periphery of the pair of brake shoes. Therefore, the opening 14 can be dimensioned large enough to accept large diameter axle shafts.

With the pair of levers 56 and 58 rotating in opposite directions, the washer 72 is urged to rotate in a counterclockwise direction, viewing FIG. 3, by both levers. As a result, the abutment surfaces 74 and 76 slide over the rotating washer, thereby preventing scoring of the washer at one location.

Although the parking mechanism described hereinabove is illustrated with a pair of brake shoes which include bifurcated webs, it is intended that such a parking mechanism is readily adaptable for use with any type of drum brake assembly. In addition, many variations of the present invention are possible by one skilled in the art and these variations are included within the scope of the appended claims.

I claim:

1. In a drum brake assembly having a brake drum rotatable about an axis and a pair of brake shoes which are movable radially by a hydraulic actuator from a non-braking position to a braking position in engagement with the drum during a service brake application, an extendible assembly having a longitudinal axis and engageable with the pair of brake shoes to substantially define the non-braking position, and a pair of levers secured to the extendible assembly, the pair of levers being pivotal in opposite directions relative to the extendible assembly to move the pair of brake shoes from the non-braking position to the braking position during a parking brake application, the extendible assembly including a pair of projections extending radially therefrom in opposite directions from the extendible assembly to define mountings which are radially offset from each other relative to the drum axis and axially offset from each other in a direction parallel of the drum axis, the mountings pivotally securing the pair of levers to the extendible assembly such that the pair of levers are pivotally secured on opposite sides of the extendible assembly at axially spaced locations.

2. The drum brake assembly of claim 1 in which the extendible assembly is movable with one of the pair of brake shoes as the one brake shoe is moved relative to the other brake shoe in response to pivoting of the pair of levers and the extendible assembly movably carries a spacer engageable with the pair of levers and the other brake shoe.

3. In a drum brake assembly having a brake drum rotatable about an axis and a pair of brake shoes, an extendible assembly engageable with the pair of brake shoes to sutbstantially define a non-braking position and a parking assembly cooperating with the extendible assembly to move the pair of brake shoes radially from the non-braking position to a braking position in engagement with the drum during a parking brake application, characterized by the parking assembly including a pair of levers pivotally secured to the extendible assembly, the pair of levers defining abutment surfaces, which oppose one of the pair of brake shoes, and pivoting in opposite directions relative to the extendible assembly during a parking brake application, the extendible assembly including a first projection pivotally mounting one of the pair of levers and a second projection pivotally mounting the other lever, and the one lever pivotally engages the first projection at a location which is radially offset from the pivotal engagement between the second projection and the other lever relative to the drum axis and axially offset from the pivotal engagement between the second projection and the other lever in a direction parallel to the drum axis.

* * * * *